US009313818B2

(12) United States Patent
Gao et al.

(10) Patent No.: US 9,313,818 B2
(45) Date of Patent: Apr. 12, 2016

(54) METHOD AND SYSTEM FOR CONVERGING CALL (75) Inventors: Yang Gao, Shenzhen (CN); Lingjiang Mu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 106 days.

(21) Appl. No.: 14/348,102

(22) PCT Filed: May 2, 2012

(86) PCT No.: PCT/CN2012/075000
§ 371 (c)(1),
(2), (4) Date: May 2, 2014

(87) PCT Pub. No.: WO2013/044631
PCT Pub. Date: Apr. 4, 2013

(65) Prior Publication Data
US 2014/0376544 A1 Dec. 25, 2014

(30) Foreign Application Priority Data
Sep. 29, 2011 (CN) .......................... 2011 1 0291058

(51) Int. Cl.
*H04L 12/66* (2006.01)
*H04W 76/02* (2009.01)
(Continued)

(52) U.S. Cl.
CPC ........... *H04W 76/026* (2013.01); *H04L 61/106* (2013.01); *H04L 65/103* (2013.01); *H04L 65/1016* (2013.01); *H04L 65/1069* (2013.01); *H04L 65/1073* (2013.01); *H04W 76/022* (2013.01); *H04W 76/027* (2013.01)

(58) Field of Classification Search
None
See application file for complete search history.

(56) References Cited

U.S. PATENT DOCUMENTS

| 2005/0083909 A1 | 4/2005 | Kuusinen |
| 2008/0039104 A1 | 2/2008 | Gu et al. |
| 2008/0112395 A1* | 5/2008 | Zhu ..................... H04Q 3/0029 370/352 |

(Continued)

FOREIGN PATENT DOCUMENTS

| CN | 1825830 A | 8/2006 |
| CN | 1842211 A | 10/2006 |

(Continued)

OTHER PUBLICATIONS

International Search Report issued in corresponding application No. PCT/CN2012/075000 on Aug. 2, 2012.

(Continued)

*Primary Examiner* — Edan Orgad
*Assistant Examiner* — Rebecca Song
(74) *Attorney, Agent, or Firm* — Brundidge & Stanger, P.C.

(57) ABSTRACT

A method for converging a call is disclosed. A non IP-Multimedia-Subsystem (IMS) network is provided with a non IMS network interworking device, by which the non IMS network is converged with a Voice over Internet Protocol (VoIP) network. The method further includes: when the non IMS network determines that a callee receiving a call request is a convergence call user, the non IMS network forwards the call request to the VoIP network; and the VoIP network initiates a call to the callee. A system for converging a call which implements the aforementioned method is further disclosed. The disclosure takes full advantage of the service characteristic of the convergence network, so as to supply users with convenient service access implementation and reduce the service charge.

17 Claims, 5 Drawing Sheets (51) Int. Cl.
*H04L 29/06* (2006.01)
*H04L 29/12* (2006.01)

(56) References Cited

U.S. PATENT DOCUMENTS

| | | | |
|---|---|---|---|
| 2008/0205381 A1* | 8/2008 | Zhu | G06Q 20/10 370/352 |
| 2009/0191873 A1* | 7/2009 | Siegel | H04L 29/1216 455/435.2 |
| 2012/0020252 A1* | 1/2012 | Bouthemy | H04W 88/16 370/259 |

FOREIGN PATENT DOCUMENTS

| | | | |
|---|---|---|---|
| CN | 1878339 | A | 12/2006 |
| CN | 1878343 | A | 12/2006 |
| CN | 1878344 | A | 12/2006 |
| CN | 1878345 | A | 12/2006 |
| CN | 1889508 | A | 1/2007 |
| CN | 1319350 | C | 5/2007 |
| CN | 101160857 | A | 4/2008 |
| CN | 100438513 | C | 11/2008 |
| CN | 100442918 | C | 12/2008 |
| CN | 100456843 | C | 1/2009 |
| CN | 100461880 | C | 2/2009 |
| CN | 100461881 | C | 2/2009 |
| CN | 102387267 | A | 3/2012 |
| EP | 1860837 | A1 | 11/2007 |
| EP | 1860837 | A4 | 9/2010 |
| KR | 10-2008-0083549 | * | 9/2008 |
| WO | 2006102850 | A1 | 10/2006 |
| WO | 2006131070 | A1 | 12/2006 |
| WO | 2006131071 | A1 | 12/2006 |

OTHER PUBLICATIONS

International Publication issued in corresponding application No. PCT/CN2012/075000 on Apr. 4, 2013.

International Search Report in international application No. PCT/CN2012/075000, mailed on Aug. 2, 2012.

English Translation of the Written Opinion of the International Search Authority in international application No. PCT/CN2012/075000, mailed on Aug. 2, 2012.

\* cited by examiner

METHOD AND SYSTEM FOR CONVERGING CALL

TECHNICAL FIELD

The disclosure relates to technology for converging a call, and particularly to a method and system for performing a convergence call on a network converging a non IP-Multimedia-Subsystem (IMS) network and a Voice over Internet Protocol (VoIP) network.

BACKGROUND

An IMS is a development direction of future multimedia communication, and is also the most important part of a Next Generation Network (NGN). The IMS is a subsystem supporting an Internet Protocol (IP) multimedia service and proposed by a Third Generation Partnership Project (3GPP), and a remarkable feature of the IMS is that a Session Initial Protocol (SIP) system is adopted and communication is independent of an access way. The IMS may have multiple capacities, such as the capacity of separating multiple multimedia service control functions from a bearing capacity, the capacity of separating a call from a session, the capacity of separating an application from a service, the capacity of separating traffic from a network, and the capacity of converging a mobile network and the Internet.

The IMS provides a new multimedia service form, provides more services for users, and opens up a new income source for operators. Multimedia services of the IMS include a VoIP, Presence, Push-to-Talk over Cellular (PoC), Instant-Message, VideoSharing, content sharing, RichCall and the like. In addition, under an enterprise's fixed environment, the IMS can also provide a service similar to existing fixed switching, for example, by an IPCentrex server, and the IMS can provide a enterprise switchboard service to implement inner-enterprise's short numbers interworking. By an IPConference server, the IMS can provide a conference call service to enable a cell phone, a Personal Computer (PC) and a traditional telephone to dial in the same system, so as to implement a conference call.

In the current industry background, mobile operators, fixed operators, and mobile/fixed mixture operators have the possibility of convergence in roles first. That is, a mobile operator may become a mobile/fixed mixture operator, and a fixed operator may obtain a mobile operating license, and so on. Therefore, all telecom operators urgently need technology to converge a mobile network and a fixed network together. And the IMS exactly has such characteristic. The IMS is independent of a specific bearing type, and may provide a consecutive service of IMS traffic (for example, from voice to multimedia data) for an arbitrary IP channel. The IMS also has an interworking capability with a traditional network, which enables an IMS terminal to implement interworking with a traditional mobile terminal and a traditional fixed terminal.

A converged network will bring users new service experience. No matter what the access network and terminal devices are, users can obtain the same voice and multimedia service in the same way. As such, the compatibility of mobility and individuation is achieved.

Nowadays, many famous Internet service providers have achieved great success by providing a user-to-user communication service, such as MSN, QQ and Skype. The provided services mainly include VoIP, instant messaging, video chat and on the like. Obviously, these applications have a great impact on existing telecom operators' voice and information services. However, at the same time, if these Internet applications are transplanted to a mobile terminal, it is also a new traffic opportunity for telecom operators. And the IMS can provide such technical means. The IMS can provide services, such as VoIP, instant messaging and video chat, which may either replace or interwork with the above Internet services. Therefore, in the face of Internet service providers, telecom operators may have multiple solutions because of the IMS: creating their own brands, competing with the Internet, and implementing the interworking cooperation or choosing competition together with cooperation.

From the point of view of Internet competitions, when users are able to access a Wireless Local Area Network (WLAN) and in a roaming area of high charge (such as international roaming), the users prefer to use VoIP applications (such as Skype and Google Voice) instead of a traditional telephone.

From the point of view of telecom networks, VoIP applications similar to Skype and Google Voice may be provided technically via an IMS, and the IMS may integrate a user number of a non IMS network, provide ways such as Internet Connection Sharing (ICS) or convergence call, thus making it incredibly competitive.

However, there is the requirement of bandwidth, for example, the access to 3G, Long Term Evolution (LTE) or a WLAN. For the data access of 2.5G, its requirement for voice or video cannot be satisfied. In consideration of the case where users are moving, it is required to supply a supplement of 2G voices, such as ICS. At the same time, in the case of daily WLAN access, for example, WLAN access at home or in the office, it is required to configure a strategy for an accessing location (geographic location), such as prohibition of registration, and permission of registration with prohibition of certain applications (such as call).

To burgeoning operators, although an advanced network such as an IMS and a Next Generation Network (NGN) has been deployed, the shortage of number segment resources of a non IMS network leads to the bottleneck of interworking between the advanced network and the non IMS network.

SUMMARY

In view of the above, the disclosure is intended to provide a method and system for converging a call, so as to provide a call service to a network into which a non IMS network and a VoIP network is converged.

To this end, the technical solutions of the disclosure are implemented as following.

A method for converging a call is provided. A non IP-Multimedia-Subsystem (IMS) network is provided with a non IMS network interworking device, by which the non IMS network is converged with a Voice over Internet Protocol (VoIP) network. The method includes:

when the non IMS network determines that a callee receiving a call request is a convergence call user, the non IMS network forwards the call request to the VoIP network; and the VoIP network initiates a call to the callee.

Preferably, when the non IMS network is a Circuit Switching (CS) domain network and the VoIP network is an IMS, the non IMS network interworking device may be a Media Gateway Control Function entity (MGCF) and/or an IP Multimedia Gateway (IM-MGW); or when the non IMS network is a soft switching network and the VoIP network is an IMS, the non IMS network interworking device may be a soft switching device.

Preferably, the forwarding the call request to the VoIP network may include:

the non IMS network converts a forwarding number of the callee into a roaming number of the VoIP network according to a forwarding service subscribed with a non IMS network number of the callee, and forwards the call request to the VoIP network according to the roaming number of the VoIP network.

Alternatively, the forwarding the call request to the VoIP network may include:

the non IMS network triggers the call request to a Session Control Function entity (SCF) of an intelligent network according to a change number triggering service subscribed with a non IMS network number of the callee; and the SCF forwards the call request to the VoIP network.

Preferably, the initiating a call to the callee by the VoIP network may include:

the non IMS network sends the call request to a Call Session Control Function entity (CSCF) of the VoIP network by the non IMS network interworking device;

the CSCF sends the call request to an Application Server (AS); and the AS initiates the call to the callee according to a call convergence strategy.

Preferably, the SCF may be an individual network element, or the SCF may be set together with the AS.

Preferably, the call convergence strategy may include:

calling a VoIP terminal of the callee preferentially; or calling the VoIP terminal preferentially, and forwarding the call to a non IMS network terminal of the callee when the VoIP terminal is busy or has no reply; or calling the VoIP terminal and the non IMS network terminal of the callee at the same time, and releasing one of the VoIP terminal and the non IMS network terminal after receiving a reply from the other of the VoIP terminal and the non IMS network terminal.

Preferably, the method may further include:

the VoIP terminal initiates a registration request to the CSCF, wherein the registration request includes an address on which the VoIP terminal is located; and the CSCF determines whether an address on which the VoIP terminal is located is an address allowing the VoIP terminal to be registered; when the address on which the VoIP terminal is located is the address allowing the VoIP terminal to be registered, the CSCF allows the VoIP terminal to register; and when the address on which the VoIP terminal is located is not the address allowing the VoIP terminal to be registered, the CSCF refuses the VoIP terminal to register.

Preferably, the method may further include:

the VoIP terminal initiates a registration request to the CSCF;

the CSCF forwards the registration request to the AS, wherein the registration request includes an address on which the VoIP terminal is located; and the AS determines whether an address on which the VoIP terminal is located is an address allowing the VoIP terminal to be registered; when the address on which the VoIP terminal is located is the address allowing the VoIP terminal to be registered, the AS allows the VoIP terminal to register; and when the address on which the VoIP terminal is located is not the address allowing the VoIP terminal to be registered, the AS refuses the VoIP terminal to register.

Preferably, the method may further include:

the VoIP terminal initiates an application request to the CSCF;

the CSCF forwards the application request to the AS, wherein the application request includes an address on which the VoIP terminal is located; and the AS determines whether the address on which the VoIP terminal is located is an address allowing the VoIP terminal to be registered; when the address on which the VoIP terminal is located is the address allowing the VoIP terminal to be registered, the AS allows the VoIP terminal to register; and when the address on which the VoIP terminal is located is not the address allowing the VoIP terminal to be registered, the AS refuses the VoIP terminal to register.

A system for converging a call is provided, in which a non IMS network is provided with a non IMS network interworking device, by which the non IMS network is converged with a VoIP network.

The non IMS network is configured to, when the non IMS network determines that a callee receiving a call request is a convergence call user, forward the call request to the VoIP network; and the VoIP network is configured to initiate a call to the callee.

Preferably, when the non IMS network is a CS domain network and the VoIP network is an IMS, the non IMS network interworking device may be an MGCF and/or an IM-MGW; or when the non IMS network is a soft switching network and the VoIP network is an IMS, the non IMS network interworking device may be a soft switching device.

Preferably, the non IMS network may be further configured to: convert a forwarding number of the callee into the roaming number of the VoIP network according to a forwarding service subscribed with a non IMS network number of the callee, and forward the call request to the VoIP network according to the roaming number of the VoIP network.

Preferably, the non IMS network may be further configured to trigger the call request to an SCF of an intelligent network according to a change number triggering service subscribed with a non IMS network number of the callee, wherein the call request is forwarded to the VoIP network by the SCF.

Preferably, the non IMS network may be further configured to send the call request to a CSCF of the VoIP network by the non IMS network interworking device;

the CSCF may be further configured to send the call to an AS; and the AS may be further configured to initiate the call to the callee according to a call convergence strategy.

Preferably, the call convergence strategy may include:

calling a VoIP terminal of the callee preferentially; or calling the VoIP terminal preferentially, and forwarding the call to a non IMS network terminal of the callee when the VoIP terminal is busy or has no reply; or calling the VoIP terminal and the non IMS network terminal of the callee at the same time, and releasing one of the VoIP terminal and the non IMS network terminal after receiving a reply from the other of the VoIP terminal and the non IMS network terminal.

In the disclosure, by converging the non IMS network and the VoIP network, a user of the non IMS network may initiate, through the non IMS network, a service to another user subscribing a convergence service, which may be implemented by the VoIP network, so as to facilitate the user to select the service access network and reduce the charge of the user's call. Of course, the service access may be implemented by preferentially using the VoIP network according to the service strategy requirement, or the user is limited to implement a service through the VoIP network according to the geographic location of the VoIP terminal. The disclosure takes full advantage of the service characteristic of the convergence network, so as to provide the user with convenient service access implementation and reduce the service charge.

DETAILED DESCRIPTION

The basic idea of the disclosure is that: by converging the non IMS network and the VoIP network, a user of the non IMS network may initiate, through the non IMS network, a service to another user subscribing a convergence service, which may be implemented by the VoIP network, so as to facilitate the user to select the service access network and reduce the charge of the user's call.

The VoIP network of the disclosure may be an IMS network, an NGN, a soft switching network or the like, to implement the convergence of the call to a non IMS network (a GSM network and a CDMA network). In the disclosure, users may decide, according to a strategy, when to preferentially use VoIP, or when to initiate and reply a call use the non IMS network. Furthermore, the aforementioned strategy and mechanisms such as a forking call, a serial call or call forwarding on no reply may be implemented by the control over convergence call.

When a user is able to access a WLAN or in a roaming area of high charge (such as international roaming), the user may preferentially use the VoIP to initiate or reply a call. Moreover, by the control of convergence call, the user may call another user of a non IMS network by the non IMS network number of the user, or another user of the non IMS network may call the user by the non IMS network number of the user.

The user has a user identifier of IMS VoIP (SIP URI or Tel URI) and a non IMS network number (such as a telephone number of GSM or CDMA), and two numbers are bound together by the control of convergence call. The user being abroad may use the VoIP of IMS to initiate a call. If the call is to a local user of the non IMS network, the IMS routs the call to the non IMS network, and sets the calling number to the non IMS network number of the caller, where the call is charged in accordance with a local call or a low charge. If other users of non IMS network call the non IMS network number of the user, the call control may be converged to transfer the call from the non IMS network to the IMS network (for example, registering the call forwarding service with the non IMS network, or being triggered by an intelligent network and change the number to the IMS), and to transmit the call to the VoIP terminal of the user by the IMS.

In the disclosure, because of the charge, the management strategy or other reasons, it is necessary to limit the use of the convergence call or part of functions of the convergence call of some users from some areas (geographic locations). Thus, it is required to have a process of certification to the registration of the convergence call or to the request of certain applications of the convergence call, and the registration and the application request which do not meet the requirement may be refused.

For example, for a user being allowed to use the convergence call during the international roaming but not in the country, the convergence call initiated by the user in the country will be registered to the IMS unsuccessfully. Alternatively, in the case that a user is allowed to use the convergence call during the international roaming, and is allowed to use an Instance Message (IM) service in the country rather than the call service of the convergence call, the user is not allowed to call in the country, but may register the IM.

In regard to the process of certification, the geographic location information or the extended network element which bears the geographic location information in an existing message (such as registration, call and Message) may be determined according to existing registration procedure. Furthermore, in consideration of security, a registration request message may be encrypted to prevent the forgery of the user.

Figure 1:
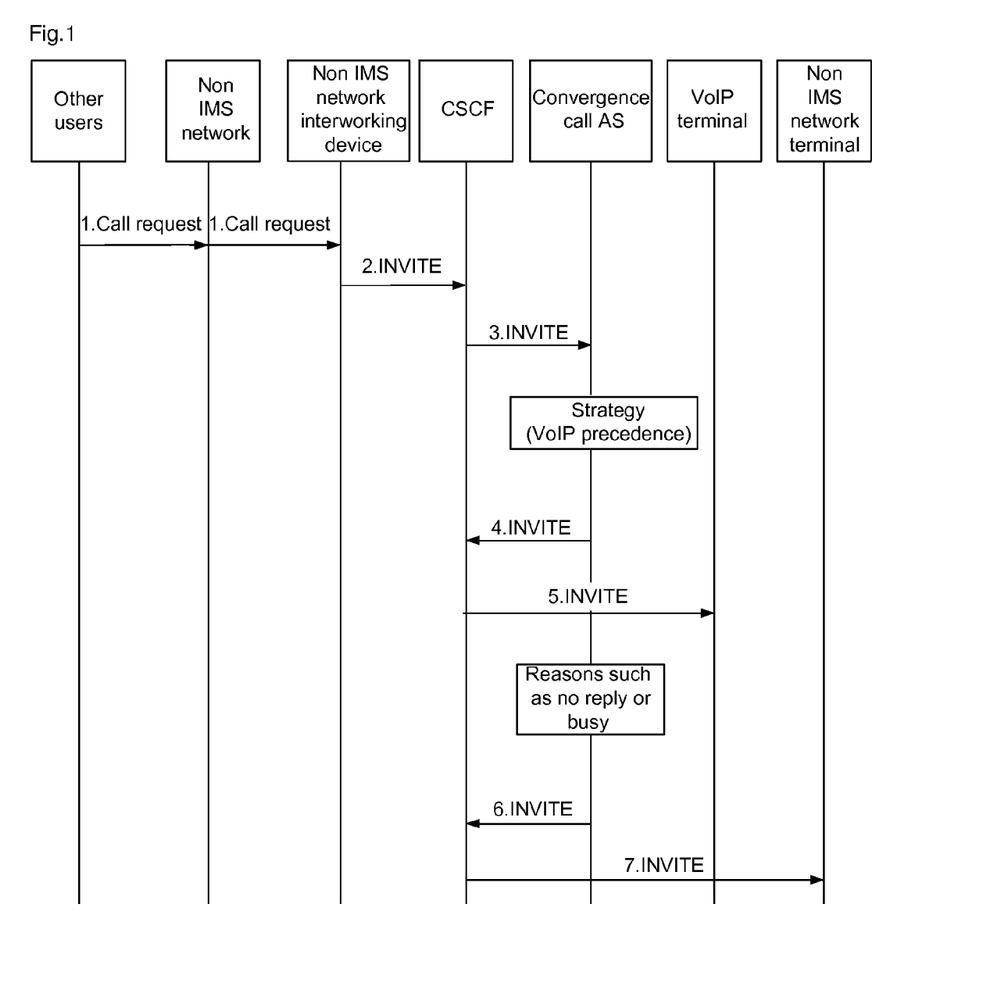
FIG. 1 shows a flowchart of convergence call according to an embodiment of the disclosure.

FIG. 1 shows a flowchart of convergence call according to an embodiment of the disclosure. According to FIG. 1, the flow of the convergence call in the example includes:

Step 1: Other users initiate a call in a non IMS network, wherein the callee in the call request is the non IMS network number of a convergence call user.

Step 2: A non IMS network forwards the call request to a Call Session Control Function entity (CSCF) of a VoIP network (such as an IMS, an NGN, or a soft switching network) by a non IMS network interworking device. Wherein, when the non IMS network is a CS network and the VoIP network is an IMS, the non IMS network interworking device is an MGCF or an IP Multimedia Media Gateway (IM-MGW). When the non IMS network is a soft switching network and the VoIP network is an IMS, the non IMS network interworking device may be a soft switching device.

The non IMS network interworking device packages the call request of the non IMS network by an SIP message, and sends the packaged call request to the CSCF.

Step 3: The CSCF sends a call to the convergence call AS.

Step 4: The convergence call AS performs the call according to the principle of VoIP terminal precedence or non IMS network terminal precedence based on the convergence call control strategy stored by the convergence call AS. The call is performed according to the principle of VoIP terminal precedence in the example.

Step 5: The convergence call AS calls the VoIP terminal.

Step 6: The CSCF forwards the INVITE.

Step 7: The convergence call AS calls the non IMS network terminal when the branch of precedence call has no reply or is busy.

In the step, in the process of calling the non IMS network terminal, the non IMS network interworking device is needed to be used.

Step 7 is an optional step.

The forwarding the call to the VoIP network by the non IMS network may be implemented by the following ways:

subscribing a forwarding service to the non IMS network number of the convergence call user, for example, a forwarding number subscribing an IMS number (in format of Tel), which is a CS Domain Roaming Number (CSRN) in the non IMS network and is converted into an IMS Domain Roaming Number (IMRN) by a Media Gateway Controller Function entity (MGCF); or subscribing change number triggering to the non IMS network number of the convergence call user, triggering to the intelligent network SCF and executing the change number operation, wherein the SCF is an independent device; or subscribing change number triggering to the non IMS network number of the convergence call user, triggering to the intelligent network SCF and executing the change number operation, wherein the SCF and the convergence call AS are set together.

Figure 2:
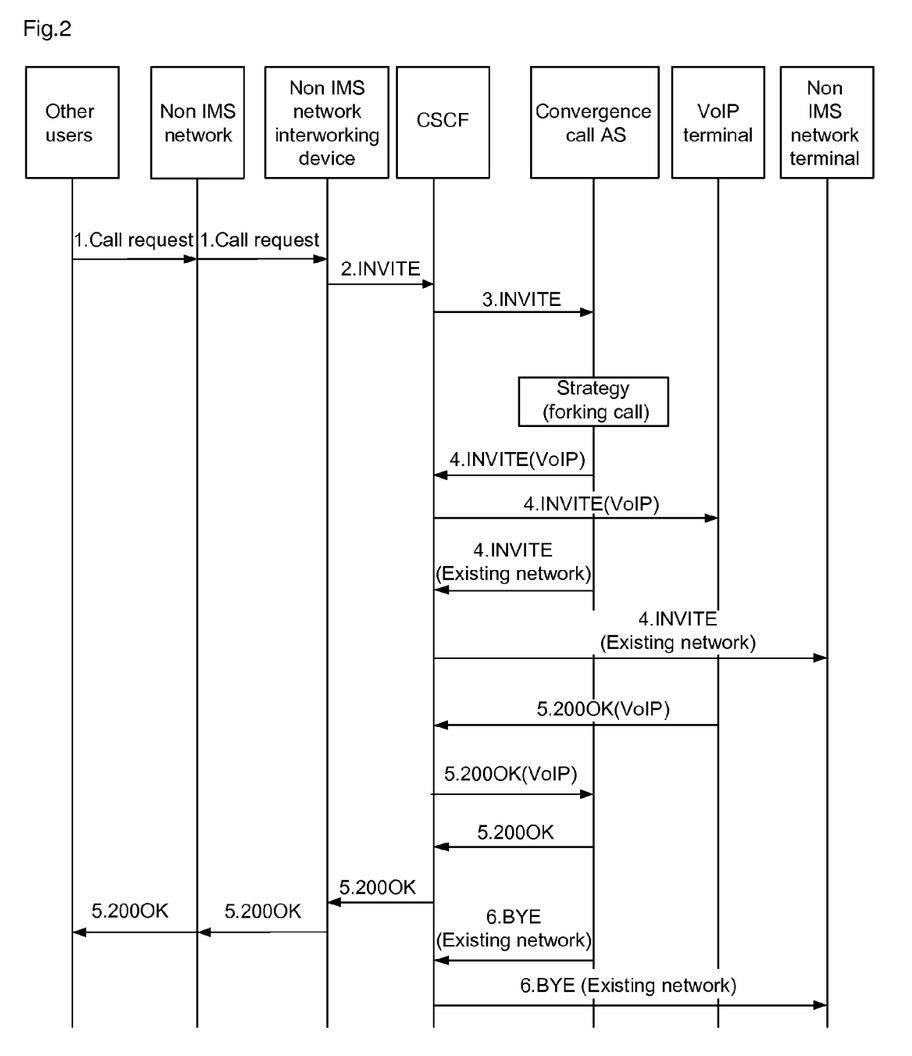
FIG. 2 shows another flowchart of convergence call according to an embodiment of the disclosure.

FIG. 2 shows another flowchart of convergence call according to an embodiment of the disclosure. According to FIG. 2, the procedure of convergence call in the example includes:

Step 1: Other users initiate a call in a non IMS network, wherein the callee in the call request is the non IMS network number of a convergence call user.

Step 2: A non IMS network forwards the call request to a Call Session Control Function entity (CSCF) of a VoIP network (such as an IMS, an NGN, or a soft switching network). Wherein, when the non IMS network is a CS network and the VoIP network is an IMS, the non IMS network interworking device is an MGCF or an IP Multimedia Media Gateway (IM-MGW). When the non IMS network is a soft switching network and the VoIP network is an IMS, the non IMS network interworking device may be a soft switching device.

The non IMS network interworking device packages the call request of the non IMS network by an SIP message, and sends the packaged call request to the CSCF.

Step 3: The CSCF sends the call request to the convergence call AS.

Step 4: The convergence call AS performs a forking call on the VoIP terminal and the non IMS network terminal according to its own strategy.

Step 5: When one of the VoIP terminal and the non IMS network terminal replies, for example, the VoIP terminal replies, 200OK is sent to the convergence call AS.

Step 6: The convergence call AS sends 200OK to the caller, and releases the other call branch (such as the non IMS network in the figure).

Figure 3:
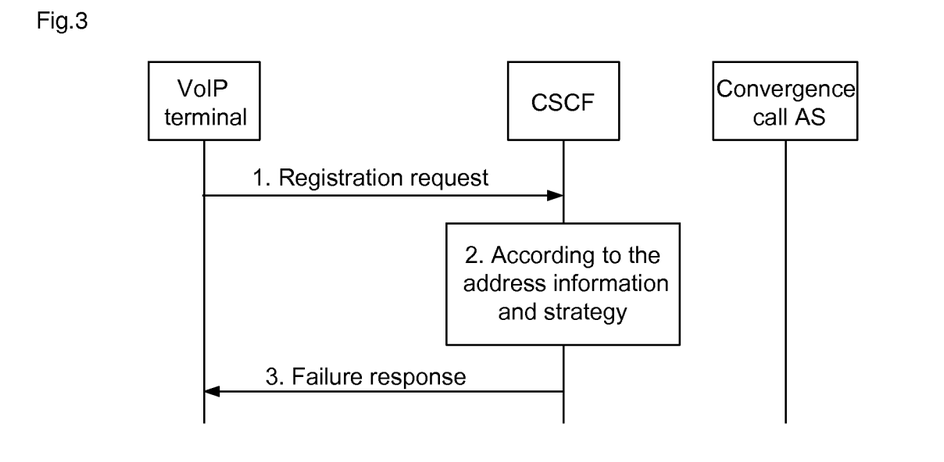
FIG. 3 shows a flowchart of certification of registration according to an embodiment of the disclosure.

FIG. 3 shows a flowchart of certification of registration according to an embodiment of the disclosure. According to FIG. 3, the flow of certification of registration in the example includes:

Step 1: A VoIP terminal (such as an IMS terminal of an IMS network) initiates registration to a CSCF (sending a registration request message to the CSCF), wherein the registration request message includes the current address information of the VoIP terminal.

Step 2: The CSCF decides, according to the strategy stored by the CSCF and the current address on which the VoIP terminal is located, whether to accept the registration request.

Step 3: A failure response is sent to the VoIP terminal if the registration request is refused.

It should be noted that the current address information of the VoIP terminal may be included either in a connection address cell in the registration request message or in a specified extension field. The address information may be encrypted.

The strategy may be: the registration requests initiated from certain addresses (or according to the geographical location information corresponding to the address information) should be refused. Of course, the strategy may also be: the VoIP terminal in a set location area can only reply but not call. In the disclosure, the setting of the strategy is not limited, and the strategy may be set according to the requirements of operators.

Figure 4:
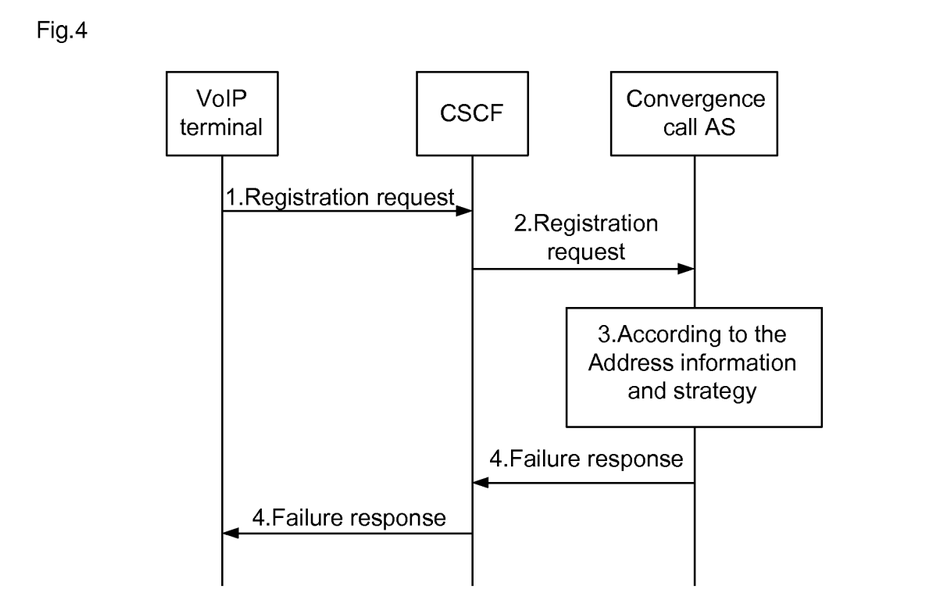
FIG. 4 shows another flowchart of certification of registration according to an embodiment of the disclosure.

FIG. 4 shows a flowchart of certification of registration according to an embodiment of the disclosure. According to FIG. 4, the flow of certification of registration in the example includes:

Step 1: A VoIP terminal (such as an IMS terminal of an IMS network) initiates registration to a CSCF (i.e., sending a registration request message to the CSCF), wherein the registration request message includes the address information of the VoIP terminal.

Step 2: The CSCF sends a registration request message to a convergence call AS, wherein the registration request message includes the current address information of the VoIP terminal.

Step 3: The convergence call AS decides, according to the strategy stored by the CSCF and the current address on which the VoIP terminal is located, whether to accept the registration request.

Step 4: The convergence call AS sends a failure response to the CSCF if the registration request is refused.

Step 5: The CSCF sends a failure response to the VoIP terminal.

It should be noted that the strategy may be: the registration requests initiated from certain addresses (or according to the geographical location information corresponding to the address information) should be refused. Of course, the strategy may also be: the VoIP terminal in a set location area can only reply but not call. In the disclosure, the setting of the strategy is not limited, and the strategy may be set according to the requirements of operators.

Figure 5:
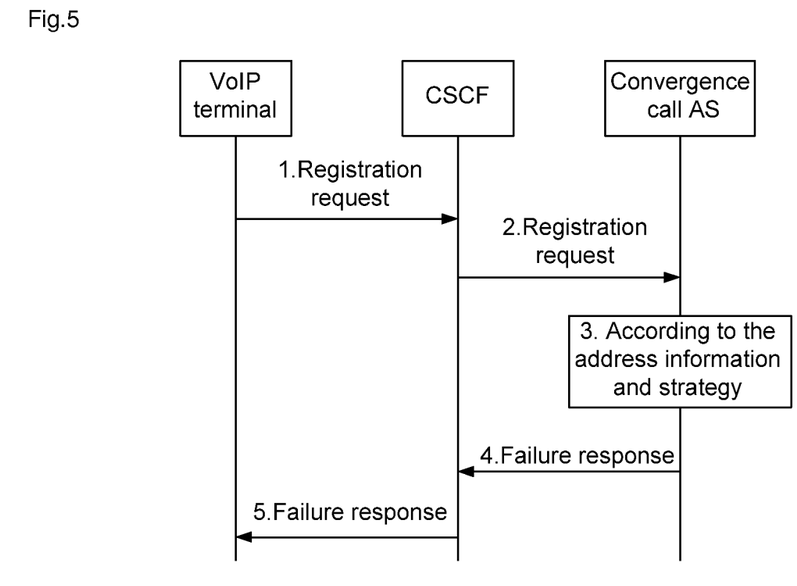
FIG. 5 shows a flowchart of verification of an application according to an embodiment of the disclosure.

FIG. 5 shows a flowchart of verification of application according to an embodiment of the disclosure. According to FIG. 5, the flow of verification of an application includes:

Step 1: A VoIP terminal (such as an IMS terminal of an IMS network) initiates an application to a CSCF (i.e., sending an application request message to the CSCF), wherein the application request message includes the current address information of the VoIP terminal.

Step 2: The CSCF sends an application request message to a convergence call AS, wherein the application request message includes the current address information of the VoIP terminal.

Step 3: The convergence call AS decides, according to the strategy stored by the CSCF and the current address on which the VoIP terminal is located, whether to accept the application request.

Step 4: The convergence call AS sends a failure response to the CSCF if the registration request is refused.

Step 5: The CSCF sends a failure response to the VoIP terminal.

The strategy may be: the registration requests initiated from certain addresses (or according to the geographical location information corresponding to the address information) should be refused. Of course, the strategy may also be: the VoIP terminal in a set location area can only reply but not call. In the disclosure, the setting of the strategy is not limited, and the strategy may be set according to the requirements of operators.

Figure 6:
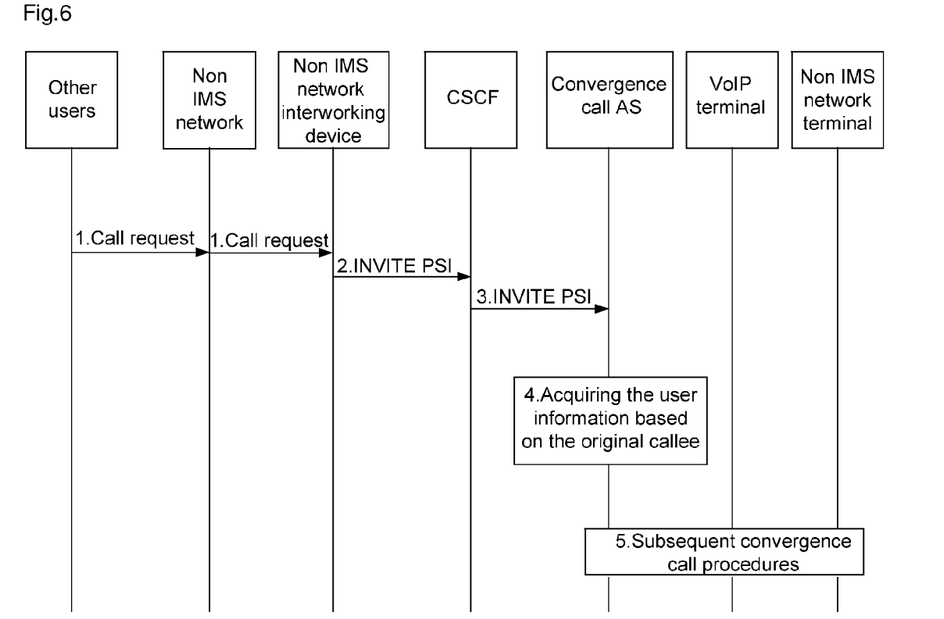
FIG. 6 shows a flowchart of calling by a moving user using a unified access code according to an embodiment of the disclosure.

FIG. 6 shows a flowchart of calling of a moving user by unified access code according to an embodiment of the disclosure. According to FIG. 6, the flow of calling by a moving user using a unified access code includes:

Step 1: Other users initiate a call in a non IMS network, wherein the callee of the call is the non IMS network number of a convergence call user.

Step 2: A non IMS network forwards the call to a CSCF of a VoIP network (such as an IMS, an NGN, or a soft switching network) by a non IMS network interworking device. Wherein, when the non IMS network is a CS network and the VoIP network is an IMS, the non IMS network interworking device is an MGCF or an M-MGW. When the non IMS network is a soft switching network and the VoIP network is an IMS, the non IMS network interworking device may be a soft switching device. When the VoIP network is not able to provide enough CSRN numbers, CSRN is provided to each convergence call user as a forwarding number. Here, the forwarding number may be a unified access code. The access code corresponds to the PSI of the convergence call AS.

Step 3: The CSCF sends the call to the convergence call AS.

Step 4: After receiving the call request, the convergence call AS may correspondingly converge the VoIP number and the non IMS network number of the convergence call user according to the original called number.

Step 5: The subsequent convergence call procedures are the same as the procedures shown in FIG. 1 and FIG. 2, which are not repeated here.

The disclosure further provides a system for converging a call, which applies to a network where a non IMS network and a VoIP network are converged. The non IMS network interworking device is set in the non IMS network, and the non IMS network is converged with the VoIP network by the non IMS network interworking device.

The non IMS network is configured to, when the non IMS network determines that a callee receiving a call request is a convergence call user, forward the call request to the VoIP network; and the VoIP network is configured to initiate a call to the callee.

When the non IMS network is a CS domain network and the VoIP network is an IMS, the non IMS network interworking device is an MGCF and/or an IM-MGW; or when the non IMS is a soft switching network and the VoIP network is an IMS, the non IMS network interworking device is a soft switching device.

The non IMS network is also configured to: convert a forwarding number of the callee into the roaming number of the VoIP network according to a forwarding service subscribed with a non IMS network number of the callee, and forward the call request to the VoIP network according to the roaming number of the VoIP network.

Alternatively, the non IMS network is further configured to trigger the call request to an SCF of an intelligent network according to a change number triggering service subscribed with a non IMS network number of the callee, wherein the call request is forwarded to the VoIP network by the SCF.

The non IMS network is further configured to send the call request to an CSCF of the VoIP network;

the CSCF is further configured to send the call request to an AS; and the AS is further configured to initiate the call to the callee according to a call convergence strategy.

The call convergence strategy includes:

calling a VoIP terminal of the callee preferentially; or calling the VoIP terminal preferentially, and forwarding the call to a non IMS network terminal of the callee when the VoIP terminal is busy or has no reply; or calling the VoIP terminal and the non IMS network terminal of the callee at the same time, and releasing one of the VoIP terminal and the non IMS network terminal after receiving a reply from the other of the VoIP terminal and the non IMS network terminal.

The VoIP terminal initiates a registration request to the CSCF, wherein the registration request comprises an address on which the VoIP terminal is located; and the CSCF determines whether the address on which the VoIP terminal is located is an address allowing the VoIP terminal to be registered; when the address on which the VoIP terminal is located is the address allowing the VoIP terminal to be registered, the CSCF allows the VoIP terminal to register; and when the address on which the VoIP terminal is located is not the address allowing the VoIP terminal to be registered, the CSCF refuses the VoIP terminal to register.

Alternatively, the VoIP terminal initiates a registration request to the CSCF;

the CSCF forwards the registration request to the AS, wherein the registration request comprises an address on which the VoIP terminal is located; and the AS determines whether the address on which the VoIP terminal is located is an address allowing the VoIP terminal to be registered; when the address on which the VoIP terminal is located is the address allowing the VoIP terminal to be registered, the AS allows the VoIP terminal to register; and when the address on which the VoIP terminal is located is not the address allowing the VoIP terminal to be registered, the AS refuses the VoIP terminal to register.

The VoIP terminal initiates an application request to the CSCF;

the CSCF forwards the application request to the AS, wherein the application request comprises an address on which the VoIP terminal is located; and the AS determines whether the address on which the VoIP terminal is located is an address allowing the VoIP terminal to be registered; when the address on which the VoIP terminal is located is the address allowing the VoIP terminal to be registered, the AS allows the VoIP terminal to register; and when the address on which the VoIP terminal is located is not the address allowing the VoIP terminal to be registered, the AS refuses the VoIP terminal to register.

The above are only the preferable embodiments of the disclosure, but are not intended to limit the scope of protection of the claims of the disclosure.

INDUSTRIAL APPLICABILITY

In the embodiments of the disclosure, by converging the non IMS network and the VoIP network, a user of the non IMS network may initiate, through the non IMS network, a service to another user subscribing a convergence service, which may be implemented by the VoIP network, so as to facilitate the user to select the service access network and reduce the charge of the user's call.

The invention claimed is:

1. A method for converging a call, wherein a non IP (Internet Protocol)-Multimedia-Subsystem (IMS) network is provided with a non-IMS network interworking device, by which the non-IMS network is converged with a Voice over Internet Protocol (VoIP) network, the method comprising:

when the non-IMS network determines that a callee receiving a call request is a convergence call user, forwarding, by the non-IMS network, the call request to the VoIP network; and initiating, by the VoIP network, a call to the callee, wherein the forwarding the call request to the VoIP network comprises:

converting, by the non-IMS network, a forwarding number of the callee into a roaming number of the VoIP network according to a forwarding service subscribed with a non-IMS network number of the callee, and forwarding the call request to the VoIP network according to the roaming number of the VoIP network, wherein the roaming number of the VoIP network is a unified access code corresponding to a Public Service Identity (PSI) of the convergence call.

2. The method according to claim 1, wherein when the non-IMS network is a Circuit Switching (CS) domain network and the VoIP network is an IMS, the non-IMS network interworking device is a Media Gateway Control Function entity (MGCF) and/or an IP Multimedia Gateway (IM-MGW); or when the non-IMS network is a soft switching network and the VoIP network is an IMS, the non-MS network interworking device is a soft switching device.

3. The method according to claim 2, wherein the forwarding the call request to the VoIP network comprises:

triggering, by the non-IMS network, the call request to a Session Control Function entity (SCF) of an intelligent network according to a change number triggering service subscribed with a non-IMS network number of the callee; and forwarding, by the SCF, the call request to the VoIP network.

4. The method according to claim 3, wherein the initiating, by the VoIP network, a call to the callee comprises:

sending, by the non-IMS network, the call request to a Call Session Control Function entity (CSCF) of the VoIP network by the non-IMS network interworking device;

sending, by the CSCF, the call request to an Application Server (AS); and initiating, by the AS, the call to the callee according to a call convergence strategy.

5. The method according to claim 2, wherein the initiating, by the VoIP network, a call to the callee comprises:

sending, by the non-IMS network, the call request to a Call Session Control Function entity (CSCF) of the VoIP network by the non-IMS network interworking device;

sending, by the CSCF, the call request to an Application Server (AS); and initiating, by the AS, the call to the callee according to a call convergence strategy.

6. The method according to claim 1, wherein the initiating, by the VoIP network, a call to the callee comprises:

sending, by the non-IMS network, the call request to a Call Session Control Function entity (CSCF) of the VoIP network by the non-IMS network interworking device;

sending, by the CSCF, the call request to an Application Server (AS); and initiating, by the AS, the call to the callee according to a call convergence strategy.

7. The method according to claim 6, wherein the SCF is an individual network element or the SCF and the AS is set together.

8. The method according to claim 6, wherein the call convergence strategy comprises:

calling a VoIP terminal of the callee preferentially; or calling the VoIP terminal preferentially, and forwarding the call to a non-IMS network terminal of the callee when the VoIP terminal is busy or has no reply; or calling the VoIP terminal and the non-IMS network terminal of the callee at the same time, and releasing one of the VoIP terminal and the non-IMS network terminal after receiving a reply from the other of the VoIP terminal and the non-IMS network terminal.

9. The method according to claim 1, further comprising:

initiating, by the VoIP terminal, a registration request to the CSCF, wherein the registration request comprises an address on which the VoIP terminal is located; and determining, by the CSCF, whether the address on which the VoIP terminal is located is an address allowing the VoIP terminal to be registered;

when the address on which the VoIP terminal is located is the address allowing the VoIP terminal to be registered, allowing, by the CSCF, the VoIP terminal to register; and when the address on which the VoIP terminal is located is not the address allowing the VoIP terminal to be registered, refusing, by the CSCF, the VoIP terminal to register.

10. The method according to claim 1, further comprising:

initiating, by the VoIP terminal, a registration request to the CSCF;

forwarding, by the CSCF, the registration request to the AS, wherein the registration request comprises an address on which the VoIP terminal is located; and determining, by the AS, whether the address on which the VoIP terminal is located is an address allowing the VoIP terminal to be registered; when the address on which the VoIP terminal is located is the address allowing the VoIP terminal to be registered, allowing, by the AS, the VoIP terminal to register; and when the address on which the VoIP terminal is located is not the address allowing the VoIP terminal to be registered, refusing, by the AS, the VoIP terminal to register.

11. The method according to claim 1, further comprising:

initiating, by the VoIP terminal, an application request to the CSCF;

forwarding, by the CSCF, the application request to the AS, wherein the application request comprises an address on which the VoIP terminal is located; and determining, by the AS, whether the address on which the VoIP terminal is located is an address allowing the VoIP terminal to be registered; when the address on which the VoIP terminal is located is the address allowing the VoIP terminal to be registered, allowing, by the AS, the VoIP terminal to register; and when the address on which the VoIP terminal is located is not the address allowing the VoIP terminal to be registered, refusing, by the AS, the VoIP terminal to register.

12. A system for converging a call, in which a non-IP (Internet Protocol)-Multimedia-Subsystem (IMS) network is provided with a non-IMS network interworking device, by which the non-IMS network is converged with a Voice over Internet Protocol (VoIP) network; wherein the non-IMS network is configured to, when the non-IMS network determines that a callee receiving a call request is a convergence call user, forward the call request to the VoIP network; and the VoIP network is configured to initiate a call to the callee, wherein the non-IMS network is further configured to:

convert a forwarding number of the callee into the roaming number of the VoIP network according to a forwarding service subscribed with a non-IMS network number of the callee, and forward the call request to the VoIP network according to the roaming number of the VoIP network, wherein the roaming number of the VoIP network is a unified access code corresponding to a Public Service Identity (PSI) of the convergence call.

13. The system according to claim 12, wherein when the non-IMS network is a Circuit Switching (CS) domain network and the VoIP network is an IMS, the non-IMS network interworking device is a Media Gateway Control Function entity (MGCF) and/or an IP Multimedia Gateway (IM-MGW); or when the non-IMS network is a soft switching network and the VoIP network is an IMS, the non-IMS network interworking device is a soft switching device.

14. The system according to claim 13, wherein the non-IMS network is further configured to trigger the call request to a Session Control Function entity (SCF) of an intelligent network according to a change number triggering service subscribed with a non-IMS network number of the callee, wherein the call request is forwarded to the VoIP network by the SCF.

15. The system according to claim 13, wherein
the non-IMS network is further configured to send the call request to a Call Session Control Function entity (CSCF) of the VoIP network by the non-IMS network interworking device;
the CSCF is further configured to send the call request to an Application Server (AS); and
the AS is further configured to initiate the call to the callee according to a call convergence strategy.

16. The system according to claim 12, wherein:
the non-IMS network is further configured to send the call request to a Call Session Control Function entity (CSCF) of the VoIP network by the non-IMS network interworking device;
the CSCF is further configured to send the call request to an Application Server (AS); and
the AS is further configured to initiate the call to the callee according to a call convergence strategy.

17. The system according to claim 16, wherein the call convergence strategy comprises:
calling a VoIP terminal of the callee preferentially; or
calling the VoIP terminal preferentially, and forwarding the call to a non-IMS network terminal of the callee when the VoIP terminal is busy or has no reply; or
calling the VoIP terminal and the non-IMS network terminal of the callee at the same time, and releasing one of the VoIP terminal and the non-IMS network terminal after receiving a reply from the other of the VoIP terminal and the non-IMS network terminal.

* * * * *